United States Patent
Wu

(10) Patent No.: US 11,150,528 B1
(45) Date of Patent: Oct. 19, 2021

(54) DISPLAY PANEL AND DISPLAY DEVICE

(71) Applicants: HKC CORPORATION LIMITED, Shenzhen (CN); CHONGQING HKC OPTOELECTRONICS TECHNOLOGY CO., LTD., Chongqing (CN)

(72) Inventor: Chuan Wu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 442 days.

(21) Appl. No.: 16/340,142

(22) PCT Filed: Nov. 27, 2018

(86) PCT No.: PCT/CN2018/117657
§ 371 (c)(1),
(2) Date: Apr. 8, 2019

(87) PCT Pub. No.: WO2020/073446
PCT Pub. Date: Apr. 16, 2020

(30) Foreign Application Priority Data

Oct. 10, 2018 (CN) .......................... 201821647908.1

(51) Int. Cl.
*G02F 1/1362* (2006.01)
*G02F 1/1339* (2006.01)

(52) U.S. Cl.
CPC ...... *G02F 1/136286* (2013.01); *G02F 1/1339* (2013.01); *G02F 1/136222* (2021.01)

(58) Field of Classification Search
None
See application file for complete search history.

(56) References Cited

U.S. PATENT DOCUMENTS

2006/0119778 A1* 6/2006 Oda ..................... G02F 1/13452
349/149

FOREIGN PATENT DOCUMENTS

| CN | 1794048 A | 6/2006 |
| CN | 101699335 A | 4/2010 |
| CN | 102331896 A | 1/2012 |
| CN | 203133452 U | 8/2013 |
| CN | 103869512 A | 6/2014 |

(Continued)

OTHER PUBLICATIONS

Jiajia Ge, the ISA written comments, Jun. 2019, CN.

*Primary Examiner* — Richard H Kim

(57) ABSTRACT

The present application discloses a display panel and a display device. The display panel includes: a first substrate, a second substrate, and an AU ball. The AU ball conducts the first substrate and the second substrate, and a position where the AU ball is disposed is a transfer pad. The first substrate includes: a base, a first metal layer, and a transparent electrode layer, and the first metal is hollowed out corresponding to the transfer pad to form a first metal recess area. The transparent electrode layer communicates with a common line of the first substrate. The AU ball is disposed at a position of the first metal recess area to communicate the transparent electrode layer of the first substrate communicates with a common electrode of the second substrate.

17 Claims, 5 Drawing Sheets

(56) References Cited

FOREIGN PATENT DOCUMENTS

| | | | |
|---|---|---|---|
| CN | 107966861 | A | 4/2018 |
| CN | 108535927 | A | 9/2018 |
| JP | 2007121687 | A | 5/2007 |

\* cited by examiner

DISPLAY PANEL AND DISPLAY DEVICE

The present application claims priority to the Chinese Patent Application No. CN201821647908.1, filed with the Chinese Patent Office on Oct. 10, 2018, and entitled "DISPLAY PANEL AND DISPLAY DEVICE", which is incorporated herein by reference in its entirety.

TECHNICAL FIELD

The present application relates to the technical field of display, and in particular, to a display panel and a display device.

BACKGROUND

The statements herein merely provide background information related to the present application and do not necessarily constitute the prior art.

A liquid crystal display has many advantages such as thin body, power-saving, and no radiation, and thus has been widely used. Most of the liquid crystal displays known to the applicant are backlight liquid crystal displays, which include a liquid crystal panel and a backlight module. The working principle of the liquid crystal panel is to place liquid crystal molecules in two parallel substrates, and apply driving voltages on the two glass substrates to control the rotation direction of the liquid crystal molecules to refract the light of the backlight module to generate a picture.

In a Liquid Crystal Display (LCD) of the Vertical Alignment (VA) technology, the liquid crystals are rotated by a vertical electric field formed between a Color Filter (CF) substrate and an array substrate, so that the liquid crystals are formed at different deflection angles, and thus an upper polarizer can transmit light of different intensities. In the electric field loading process, the electric field on the CF substrate is introduced from the array substrate to the CF substrate by a transfer pad. Generally, a latticed common voltage (Vcom) wire of a first metal layer and a second metal layer is disposed around the panel, and the transfer pad is designed at a suitable position. The transfer pad is formed by placing a transparent electrode layer on the first metal layer or the first metal layer and the second metal layer. During the actual operation of the panel, a Vcom signal transmitted by the first metal layer passes through first metal layer via the AU ball at the transfer pad to the transparent electrode layer of the CF substrate, and is transmitted from the array substrate to the CF substrate.

A transfer pad is prepared in a sealant region of the array substrate except an Active Area (AA), and then AU ball distribution is performed during the process of preparing a liquid crystal cell to form electric connection between the pixel electrode and the common electrode. However, when the sealant and the AU ball are coated, the display is abnormal.

SUMMARY

The present application provides a display panel and a display device to improve the display quality.

The present application provides a display panel, including: a first substrate, a second substrate opposite to the first substrate, and an AU ball; the first substrate includes a common line, and the second substrate includes a common electrode; the AU ball is disposed in a non-display area of the display panel and is configured to conduct the common line of the first substrate and the common electrode of the second substrate, a position where the AU ball is disposed is a transfer pad; the first substrate includes: a base, a first metal layer, a gate insulating layer, a second metal layer, a passivation layer, and a transparent electrode layer; the first metal layer is disposed on the base and is hollowed out corresponding to the transfer pad to form a first metal recess area; the gate insulating layer is disposed on the first metal layer and is hollowed out corresponding to the first metal recess area form a gate insulating recess area; the second metal layer is disposed on the gate insulating layer, and a part of the second metal layer corresponding to the gate insulating recess area is hollowed out to form a second metal recess area; the passivation layer is disposed on the second metal layer, and a part of the passivation layer corresponding to the second metal recess area is hollowed out to form a passivation recess area; the transparent electrode layer covers the first metal recess area and communicates with the common line of the first substrate; and the AU ball is disposed on a position of the transparent electrode layer corresponding to the first metal recess area to communicate the transparent electrode layer of the first substrate with the common electrode of the second substrate.

Optionally, a width of the gate insulating recess area is greater than a width of the first metal recess area; an exposed surface of the first metal layer is a first metal transfer pad, and the first metal transfer pad is covered by the transparent electrode layer.

Optionally, a width of the first metal transfer pad is at least equal to 5 μm and no more than 500 μm.

Optionally, the first metal layer and the common line of the first substrate are formed in a same layer, and the first metal layer and the common line of the first substrate are electrically connected to each other.

Optionally, the width of the gate insulating recess area is equal to a width of the second metal recess area, and the width of the gate insulating recess area is equal to a width of the passivation recess area.

Optionally, the common line is disposed in the first metal layer, and the transparent electrode layer communicates with the first metal layer.

Optionally, the common line is disposed in the second metal layer, and the transparent electrode layer communicates with the second metal layer.

Optionally, the width of the passivation recess area is greater than the width of a recess area of the second metal layer; an exposed surface of the second metal layer is a second metal transfer pad; and the transparent electrode layer covers the gate insulating layer, a side wall of one side of the second metal layer corresponding to the second metal recess area, and the second metal transfer pad.

Optionally, the second metal layer and the common line of the first substrate are formed in a same layer, and the second metal layer and the common line of the first substrate are electrically connected to each other.

Optionally, the width of the second metal recess area is greater than the width of the gate insulating recess area, and the width of the gate insulating recess area is greater than the width of the first metal recess area.

Optionally, the first substrate is an array substrate, and the second substrate is a CF substrate.

Optionally, the base is a glass substrate.

The present application further discloses a process for preparing a display panel, including the following steps:

covering a metal material layer on a base, and etching a middle portion of the metal material layer corresponding to a transfer pad to form a first metal layer and a first metal recess area in a non-display area and a common line in a display area;

forming a gate insulating layer on the first metal layer, and etching a part of the gate insulating layer corresponding to the transfer pad to form a gate insulating recess area;

forming a second metal layer on the gate insulating layer, and etching a part of the second metal layer corresponding to the gate insulating recess area;

forming a passivation layer on the second metal layer, and etching a part of the passivation layer corresponding to the gate insulating recess area;

forming a transparent electrode layer on the first metal recess area, and communicating the transparent electrode layer with the common line to form a first substrate;

forming a second substrate provided with a common electrode; and disposing an AU ball on the transparent electrode layer, and communicating the transparent electrode layer of the first substrate with the common electrode of the second substrate by the AU ball.

Optionally, in the step of forming a gate insulating layer on the first metal layer, and etching a part of the gate insulating layer corresponding to the transfer pad to form a gate insulating recess area, a width of the gate insulating recess area is greater than a width of the first metal recess area, an exposed surface of the first metal layer is a first metal transfer pad, and the formed transparent electrode layer covers the first metal transfer pad.

Optionally, the first metal layer and the common line of the first substrate are formed in a same layer, and the first metal layer and the common line of the first substrate are electrically connected to each other.

The present application further discloses a display device, including the display panel.

Optionally, the display device is one of a twisted nematic display device, an in-plane switching display device, and a multi-domain vertical alignment display device.

The liquid crystals are rotated by a vertical electric field formed between a first substrate and a second substrate, so that the liquid crystals are formed at different deflection angles, and thus an upper polarizer can transmit light of different intensities. In the electric field loading process, in order to conduct the common line of the first substrate and the common electrode of the second substrate, a conductive transfer pad is disposed in the sealant of the first substrate so that the AU ball is in contact with the upper and lower substrates; moreover, the transfer pad is not disposed at a position where no AU ball is disposed. The transfer pad of the first substrate is coated with a first metal layer of a conductive layer communicated with the common line; moreover, for a position where no transfer pad is disposed, the common line is hollowed out into lattices to irradiate and cure the sealant. In such solution, after cell-assembled, if the AU ball is extruded out of the transfer pad when the AU ball and the sealant are coated, the upper and lower substrates are not well connected, or the cell thickness is abnormal to cause abnormal display. Moreover, in this solution, during preparation of the first substrate, the substrate is covered by a metal material layer, and a part of the metal material layer corresponding to the transfer pad is etched to form a first metal recess area; a transparent electrode layer is formed above the first metal recess area, and the transparent electrode layer is electrically connected to the common line; an AU ball is disposed above the transparent electrode layer, and the AU ball communicates the common line of the first substrate with the common electrode of the second substrate; the first metal recess area increases the width of the transfer pad, so as to avoid the coated AU ball and sealant flowing over the transfer pad to improve the display quality.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

Figure 1:
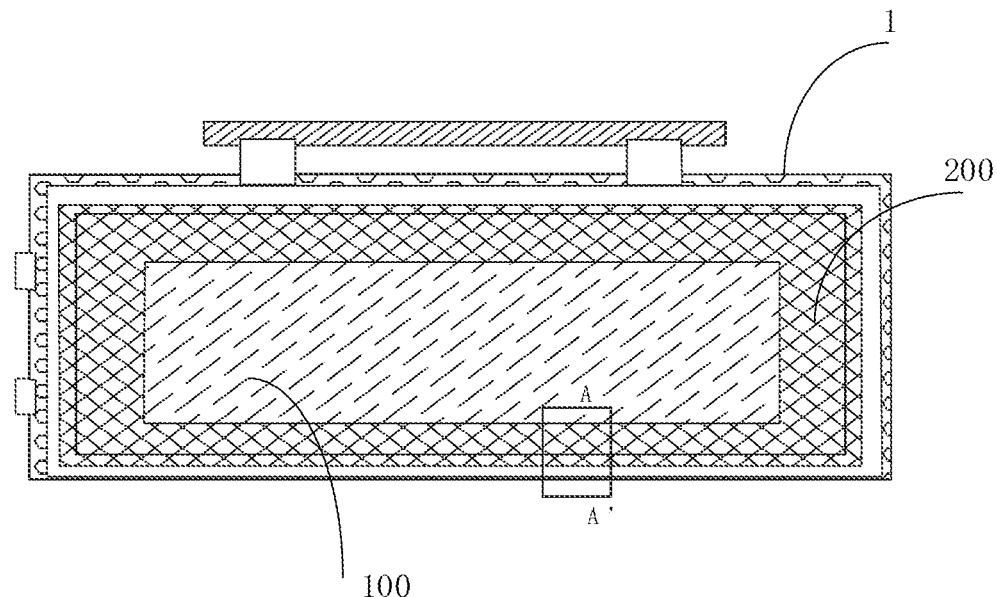
FIG. 1 is a schematic diagram of a basic structure of a display panel according to an embodiment of the present application.
Figure 2:
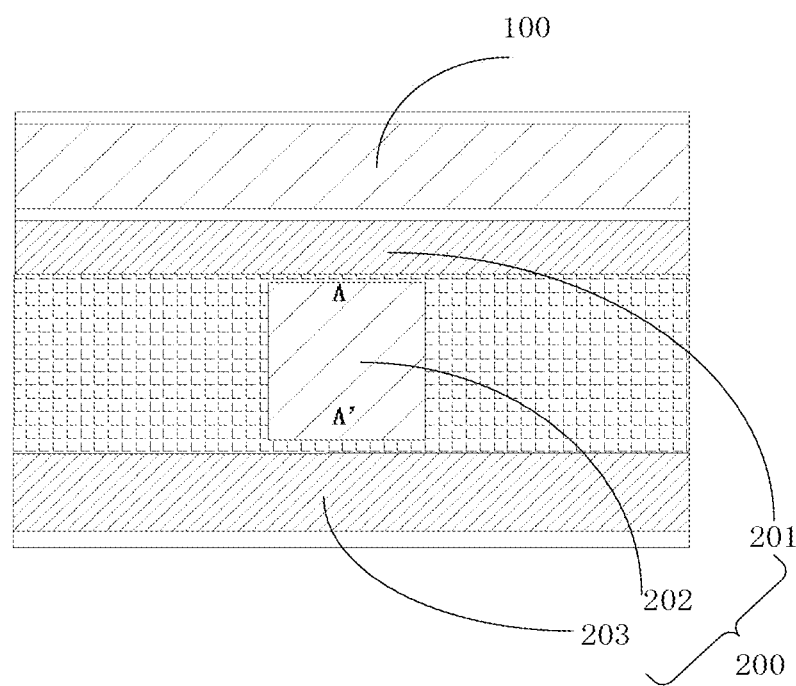
FIG. 2 is an enlarged schematic diagram of a region A-A' of FIG. 1.
Figure 3:
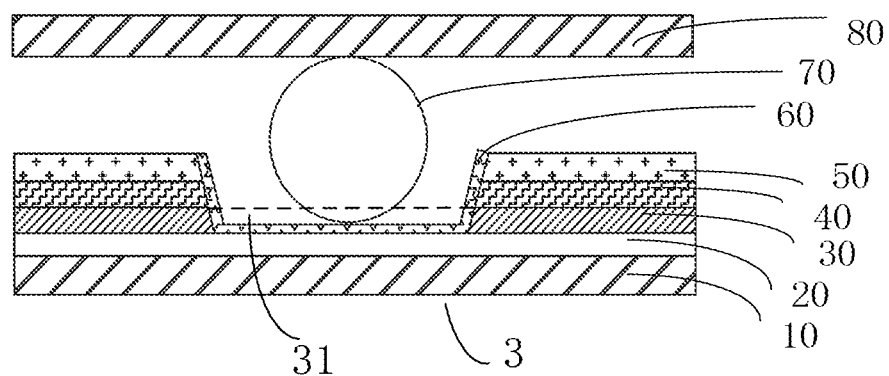
FIG. 3 is a schematic diagram of a sectional view of the region A-A' of FIG. 1.

The specific structure and function details of the present application are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms "first", "second" are merely for a descriptive purpose, and cannot to be understood to indicate or imply a relative importance, or implicitly indicate the number of the indicated technical features. Hence, the features defined by "first", "second" can explicitly or implicitly include one or more of the features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or electrically connected; or directly connected or indirectly connected through an intermediate medium, or in an internal communication between two elements. The specific meanings about the foregoing terms in the present application may be understood by a person of ordinary skill in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

The present application is described below with reference to the accompanying drawings and optional embodiments.

As shown in FIGS. 1-6, the present application discloses a display panel, including:

a first substrate 3, a second substrate 80 opposite to the first substrate 3, and an AU ball 70; the first substrate 3 includes a common line, and the second substrate 80 includes a common electrode; the AU ball 70 is disposed in a non-display area 200 of the display panel 2 and is configured to conduct the common line of the first substrate 3 and the common electrode of the second substrate 80, a position where the AU ball 70 is disposed is a transfer pad 202;

the first substrate 3 includes: a base 10, a first metal layer 20, a gate insulating layer 30, a second metal layer 40, a passivation layer 50, and a transparent electrode layer 60; the first metal layer 20 is disposed on the base 10 and is hollowed out corresponding to the transfer pad 202 to form a first metal recess area 21; the gate insulating layer 30 is disposed on the first metal layer 20 and is hollowed out corresponding to the first metal recess area 21 form a gate insulating recess area 31; the second metal layer 40 is disposed on the gate insulating layer 30, and a part of the second metal layer 40 corresponding to the gate insulating recess area 31 is hollowed out to form a second metal recess area 41; the passivation layer 50 is disposed on the second metal layer 40, and a part of the passivation layer 50 corresponding to the second metal recess area 41 is hollowed out to form a passivation recess area 51; the transparent electrode layer 60 covers the first metal recess area 21 and communicates with the common line of the first substrate 3; and the AU ball 70 is disposed on a position of the transparent electrode layer 60 corresponding to the first metal recess area 21 to communicate the transparent electrode layer 60 of the first substrate 3 with the common electrode of the second substrate 80, where the base may be a glass substrate.

The liquid crystals are rotated by a vertical electric field formed between the first substrate 3 and the second substrate 80, so that the liquid crystals are formed at different deflection angles, and thus an upper polarizer can transmit light of different intensities. In the electric field loading process, in order to conduct the common line of the first substrate 3 and the common electrode of the second substrate 80, a conductive transfer pad 202 is disposed in the sealant of the first substrate 3 so that the AU ball 70 is in contact with the upper and lower substrates; moreover, the transfer pad 202 is not disposed at a position where no AU ball 70 is disposed. The transfer pad 202 of the first substrate 3 is coated with a first metal layer 20 of a conductive layer communicated with the common line; moreover, for a position where no transfer pad 202 is disposed, the common line is hollowed out into lattices to irradiate and cure the sealant. In such solution, after cell-assembled, if the AU ball 70 is extruded out of the transfer pad 202 when the AU ball 70 and the sealant are coated, the upper and lower substrates are not well connected, or the cell thickness is abnormal to cause abnormal display. Moreover, in this solution, during preparation of the first substrate 3, the substrate is covered by a metal material layer, and a part of the metal material layer corresponding to the transfer pad 202 is etched to form a first metal recess area 21; a transparent electrode layer 60 is formed above the first metal recess area 21, and the transparent electrode layer 60 is electrically connected to the common line; an AU ball 70 is disposed above the transparent electrode layer 60, and the AU ball 70 communicates the common line of the first substrate 3 with the common electrode of the second substrate 80; the first metal recess area 21 increases the width of the transfer pad 202, so as to avoid the coated AU ball 70 and sealant flowing over the transfer pad 202 to improve the display quality, where the first substrate 3 is an array substrate, and the second substrate 80 is a CF substrate.

Figure 4:
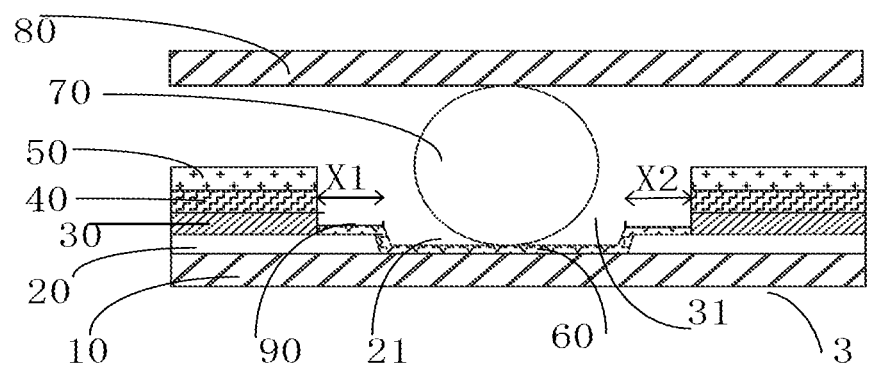
FIG. 4 is a schematic diagram of a structure of a display panel according to an embodiment of the present application.

In an embodiment, as shown in FIG. 4, a width of the gate insulating recess area 31 is greater than a width of the first metal recess area 21; an exposed surface of the first metal layer 20 is a first metal transfer pad 90, and the first metal transfer pad 90 is covered by the transparent electrode layer 60. In this solution, the width of the gate insulating recess area 31 is greater than the width of the first metal recess area 21, and both the first metal recess area 21 and the first metal transfer pad 90 are covered by the transparent electrode layer 60; the transparent electrode layer 60 and the first metal layer 20 have sufficient contact area, so that the connectivity of the transparent electrode layer 60 and the common line is superior, and the electric conductivity is superior and more stable.

In an embodiment, the first metal layer 20 and the common line of the first substrate 3 are formed in a same layer, and the first metal layer 20 and the common line of the first substrate 3 are electrically connected to each other. In this embodiment, the first substrate 3 is an array substrate; the first metal layer 20 and the common line of the array substrate are formed in a same layer to connect the electrode without punching a hole, and thus the preparation process is reduced.

In an embodiment, as shown in FIG. 4, the width of the gate insulating recess area 31 is equal to a width of the second metal recess area 41, and the width of the gate insulating recess area 31 is equal to a width of the passivation recess area 51. In this solution, the width of the gate insulating recess area 31, the width of the second metal recess area 41, and the width of the passivation recess area 51 are equal; the AU ball 70 is disposed at the first metal recess area 21; a segment gap is formed between other recess areas and the first metal recess area 21 since the widths of other recess areas are equal to each other and are greater than the width of the first metal recess area 21; therefore, even if the AU ball 70 offsets due to extrusion force, the AU ball 70 would not offset to other place, ensuring the conduction effect of the AU ball 70.

In an embodiment, the common line is disposed in the first metal layer 20, and the transparent electrode layer 60 communicates with the first metal layer 20. In this solution, the common line is disposed in the first metal layer 20, and the transparent conductive layer covers the first metal transfer pad 90, and thus the transparent conductive layer and the common line are well conducted. Of course, the common line can also be disposed in the second metal layer, and the transparent electrode layer communicates with the second metal layer.

Figure 5:
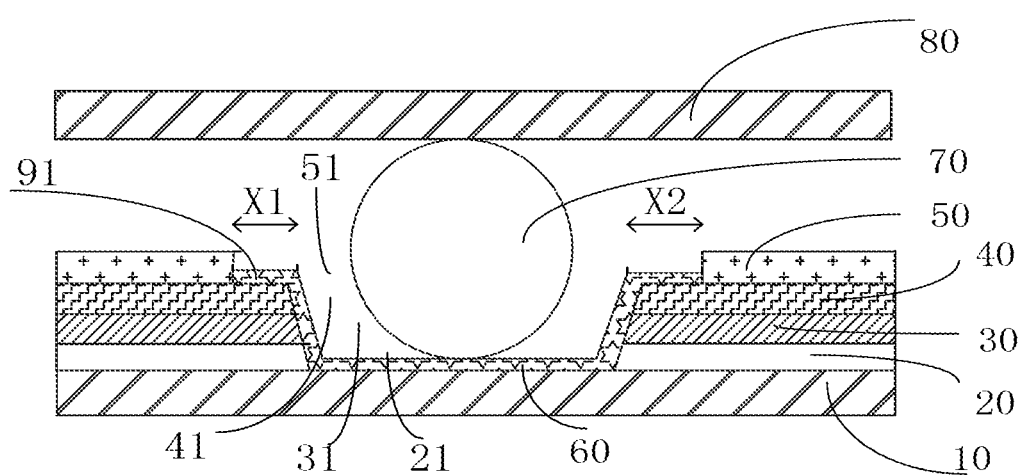
FIG. 5 is a schematic diagram of a structure of another display panel according to an embodiment of the present application.

In an embodiment, as shown in FIG. 5, the width of the passivation recess area 51 is greater than the width of a recess area of the second metal layer 40; an exposed surface of the second metal layer 40 is a second metal transfer pad 91; and the transparent electrode layer 60 covers the gate insulating layer 30, a side wall of one side of the second metal layer 40 corresponding to the second metal recess area 41, and the second metal transfer pad 91.

In this solution, the transparent electrode layer 60 covers the gate insulating layer 30, a side wall of one side of the second metal layer 40 corresponding to the second metal recess area 41, and the second metal transfer pad 91; and the transparent electrode layer 60 communicates with the common line through the second metal transfer pad 91; moreover, the AU ball 70 is disposed on the transparent electrode layer 60 so that the AU ball 70 communicates the transparent electrode layer 60 of the first substrate 3 with the common electrode of the second substrate 80, and finally the common line of the first substrate 3 and the common electrode of the second substrate 80 are conducted. In this way, since the second metal transfer pad 91 increases the overall width of the transfer pad 202, the coated sealant flowing over the transfer pad 202 can be avoided, and thus the display quality is improved.

In an embodiment, the second metal layer 40 and the common line of the first substrate 3 are formed in a same layer, and the second metal layer 40 and the common line of the first substrate 3 are electrically connected to each other. In this embodiment, the first substrate 3 is an array substrate; the second metal layer 40 and the common line of the array substrate are formed through a same preparation process, the number of masks is reduced, the preparation process is reduced, and thus the production efficiency is improved.

In an embodiment, the width of the second metal recess area 41 is greater than the width of the gate insulating recess area 31, and the width of the gate insulating recess area 31 is greater than the width of the first metal recess area 21. In this solution, the width of the second metal recess area 41 is greater than the width of the gate insulating recess area 31, and the width of the gate insulating recess area 31 is greater than the width of the first metal recess area 21, and the display panel is increased stepwise from the first metal recess area 21, and thus the accommodating space of the sealant is relatively increased, and the display quality is improved.

As another embodiment of the present application, as shown in FIG. 4, a display panel 2, including:

an array substrate, a CF substrate, and an AU ball; the array substrate is opposite to the CF substrate; the array substrate includes a common line, and the CF substrate includes a common electrode; the AU ball 70 is disposed in a non-display area 200 of the display panel 2 and is configured to conduct the common line of the array substrate and the common electrode of the CF substrate, a position where the AU ball 70 is disposed is a transfer pad 202;

the array substrate includes: a base 10, a first metal layer 20, a gate insulating layer 30, a second metal layer 40, a passivation layer 50, and a transparent electrode layer 60; the first metal layer 20 is disposed on the substrate and is hollowed out corresponding to the transfer pad 202 to form a first metal recess area 21; the gate insulating layer 30 is disposed on the first metal layer 20 and is hollowed out corresponding to the first metal recess area 21 form a gate insulating recess area 31; a width of the gate insulating recess area 31 is greater than a width of the first metal recess area 21, and an exposed surface of the first metal layer is a first metal transfer pad; the second metal layer 40 is disposed on the gate insulating layer 30, and a part of the second metal layer 40 corresponding to the gate insulating recess area 31 is hollowed out to form a second metal recess area 41; the passivation layer 50 is disposed on the second metal layer 40, and a part of the passivation layer 50 corresponding to the second metal recess area 41 is hollowed out to form a passivation recess area 51; the transparent electrode layer 60 covers the first metal recess area 21 and the first metal transfer pad, and communicates with the common line of the array substrate; and the AU ball 70 is disposed on a position of the transparent electrode layer 60 corresponding to the first metal recess area 21 to communicate the transparent electrode layer 60 of the array substrate with the common electrode of the CF substrate.

The liquid crystals are rotated by a vertical electric field formed between the first substrate 3 and the second substrate 80, so that the liquid crystals are formed at different deflection angles, and thus an upper polarizer can transmit light of different intensities. In the electric field loading process, in order to conduct the common line of the first substrate 3 and the common electrode of the second substrate 80, a conductive transfer pad 202 is disposed in the sealant of the first substrate 3 so that the AU ball 70 is in contact with the upper and lower substrates; moreover, the transfer pad 202 is not disposed at a position where no AU ball 70 is disposed. The transfer pad 202 of the first substrate 3 is coated with a first metal layer 20 of a conductive layer communicated with the common line; moreover, for a position where no transfer pad 202 is disposed, the common line is hollowed out into lattices to irradiate and cure the sealant. In such solution, after cell-assembled, if the AU ball 70 is extruded out of the transfer pad 202 when the AU ball 70 and the sealant are coated, the upper and lower substrates are not well connected, or the cell thickness is abnormal to cause abnormal display. Moreover, in this solution, during preparation of the first substrate 3, the substrate is covered by a metal material layer, and a part of the metal material layer corresponding to the transfer pad 202 is etched to form a first metal recess area 21; a transparent electrode layer 60 is formed above the first metal recess area 21, and the transparent electrode layer 60 is electrically connected to the common line; an AU ball 70 is disposed above the transparent electrode layer 60, and the AU ball 70 communicates the common line of the first substrate 3 with the common electrode of the second substrate 80; the first metal recess area 21 increases the width of the transfer pad 202, so as to avoid the coated AU ball 70 and sealant flowing over the transfer pad 202 to improve the display quality.

A thickness of the first metal layer 20 is generally 1,500-8,000 Å, a thickness of the second metal layer 40 is generally 1,500-8,000 Å, and a thickness of a transparent electrode layer 60 is generally 200-1,000 Å. A width of the first metal transfer pad 90 close to a first connect area 201 is X1, and generally, the range of X1 is 5 μm≤X1≤500 μm. A width of the first metal transfer pad 90 close to a second connect area 203 is X2, and generally, the range of X2 is 5 μm≤X2≤500 μm.

Figure 6:
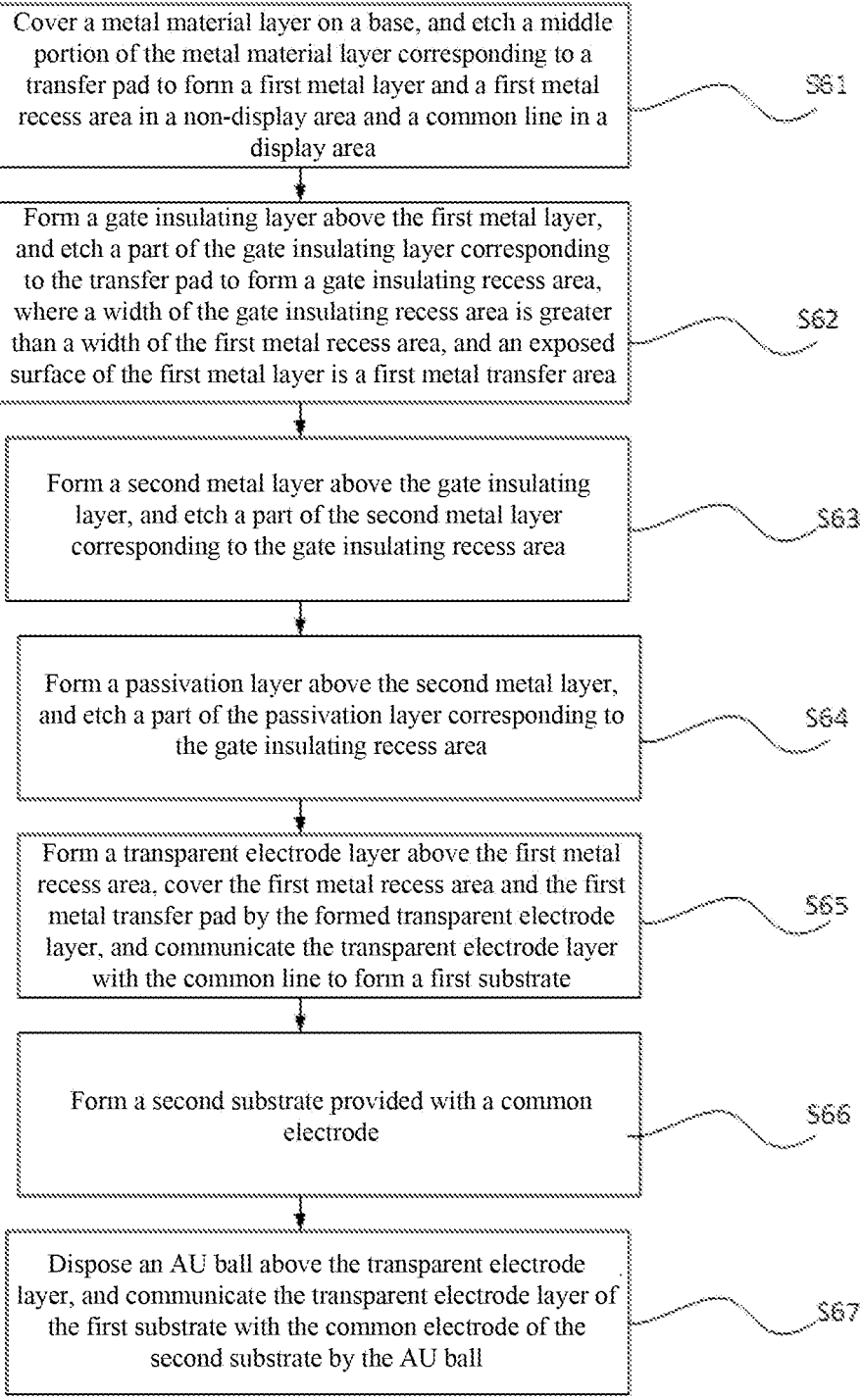
FIG. 6 is a schematic flowchart of another display panel according to an embodiment of the present application.

As another embodiment of the present application, as shown in FIG. 6, the present application further discloses a process for preparing a display panel 2, including the following steps:

S61: Cover a metal material layer on a base, and etch a middle portion of the metal material layer corresponding to a transfer pad to form a first metal layer and a first metal recess area in a non-display area and a common line in a display area.

S62: Form a gate insulating layer on the first metal layer, and etch a part of the gate insulating layer corresponding to the transfer pad to form a gate insulating recess area, where a width of the gate insulating recess area is greater than a width of the first metal recess area, and an exposed surface of the first metal layer is a first metal transfer pad.

S63: Form a second metal layer on the gate insulating layer, and etch a part of the second metal layer corresponding to the gate insulating recess area.

S64: Form a passivation layer on the second metal layer, and etch a part of the passivation layer corresponding to the gate insulating recess area.

S65: Form a transparent electrode layer on the first metal recess area, cover the first metal recess area and the first metal transfer pad by the formed transparent electrode layer, and communicate the transparent electrode layer with the common line to form a first substrate.

S66: Form a second substrate provided with a common electrode.

S67: Dispose an AU ball on the transparent electrode layer, and communicate the transparent electrode layer of the first substrate with the common electrode of the second substrate by the AU ball.

In an embodiment, in the step of forming a gate insulating layer on the first metal layer, and etching a part of the gate insulating layer corresponding to the transfer pad to form a gate insulating recess area, a width of the gate insulating recess area is greater than a width of the first metal recess area, an exposed surface of the first metal layer is a first metal transfer pad, and the formed transparent electrode layer covers the first metal transfer pad. In this solution, the width of the gate insulating recess area is greater than the width of the first metal recess area, and both the first metal recess area and the first metal transfer pad are covered by the transparent electrode layer; the transparent electrode layer and the first metal layer have sufficient contact area, so that the connectivity of the transparent electrode layer and the common line is superior, and the electric conductivity is superior and more stable.

In an embodiment, the first metal layer and the common line of the first substrate are formed in a same layer, and the first metal layer and the common line of the first substrate are electrically connected to each other. In this solution, the common line is disposed in the first metal layer, and the transparent conductive layer covers the first metal transfer pad, and thus the transparent conductive layer and the common line are well conducted.

Figure 7:
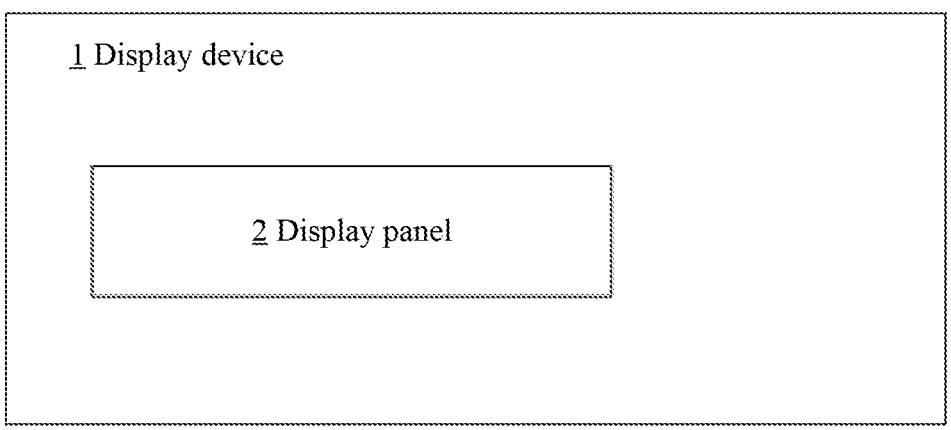
FIG. 7 is a schematic structural diagram of a display device according to an embodiment of the present application.

As another embodiment of the present application, as shown in FIG. 7, the present application further discloses a display device 1, including the display panel 2.

It should be noted that the definitions of steps involved in this solution are not intended to limit the sequence of steps without affecting the implementation of the specific solution. The preceding steps can be executed anteriorly, and can also be executed posteriorly, or even can be executed simultaneously. As long as this solution can be implemented, it should be considered as the scope of protection of the present application.

The panel in the present application may be a Twisted Nematic (TN) panel, an In-Plane Switching (IPS) panel, and a Multi-domain Vertical Alignment (VA) panel, and of course, may also be other types of panels, if appropriate.

The contents above are detailed descriptions of the present application in conjunction with optional specific embodiments, and the specific implementation of the present application is not limited to these descriptions. It will be apparent to those skilled in the art that various simple deductions or substitutions may be made without departing from the spirit of the present application, and should be considered to be within the scope of protection of the present application.

What is claimed is:

1. A display panel, comprising:
   a first substrate;
   a second substrate opposite to the first substrate, wherein the first substrate comprises a common line, and the second substrate comprises a common electrode; and
   an AU ball disposed in a non-display area of the display panel and configured to conduct the common line of the first substrate and the common electrode of the second substrate, a position where the AU ball is disposed is a transfer pad;
   the first substrate comprises:
   a base;
   a first metal layer disposed on the base and hollowed out corresponding to the transfer pad to form a first metal recess area;
   a gate insulating layer disposed on the first metal layer and hollowed out corresponding to the first metal recess area form a gate insulating recess area;
   a second metal layer disposed on the gate insulating layer, a part of the second metal layer corresponding to the gate insulating recess area being hollowed out to form a second metal recess area;
   a passivation layer disposed on the second metal layer, a part of the passivation layer corresponding to the second metal recess area being hollowed out to form a passivation recess area; and
   a transparent electrode layer covering the first metal recess area and communicating with the common line of the first substrate;
   the AU ball is disposed on a position of the transparent electrode layer corresponding to the first metal recess area to communicate the transparent electrode layer of the first substrate with the common electrode of the second substrate.

2. The display panel according to claim 1, wherein a width of the gate insulating recess area is greater than a width of the first metal recess area;
   an exposed surface of the first metal layer is a first metal transfer pad, and the first metal transfer pad is covered by the transparent electrode layer.

3. The display panel according to claim 2, wherein a width of the first metal transfer pad is at least equal to 5 μm and no more than 500 μm.

4. The display panel according to claim 2, wherein the width of the gate insulating recess area is equal to a width of the second metal recess area, and the width of the gate insulating recess area is equal to a width of the passivation recess area.

5. The display panel according to claim 2, wherein the common line is disposed in the first metal layer, and the transparent electrode layer communicates with the first metal layer.

6. The display panel according to claim 2, wherein the common line is disposed in the second metal layer, and the transparent electrode layer communicates with the second metal layer.

7. The display panel according to claim 1, wherein the first metal layer and the common line of the first substrate are formed in a same layer, and the first metal layer and the common line of the first substrate are electrically connected to each other.

8. The display panel according to claim 1, wherein the width of the passivation recess area is greater than the width of a recess area of the second metal layer; an exposed surface of the second metal layer is a second metal transfer pad; and the transparent electrode layer covers the gate insulating layer, a side wall of one side of the second metal layer corresponding to the second metal recess area, and the second metal transfer pad.

9. The display panel according to claim 1, wherein the second metal layer and the common line of the first substrate are formed in a same layer, and the second metal layer and the common line of the first substrate are electrically connected to each other.

10. The display panel according to claim 8, wherein the width of the second metal recess area is greater than the width of the gate insulating recess area, and the width of the gate insulating recess area is greater than the width of the first metal recess area.

11. The display panel according to claim 1, wherein the first substrate is an array substrate, and the second substrate is a color filter substrate.

12. The display panel according to claim 1, wherein the base is a glass substrate.

13. A process for preparing a display panel, comprising the following steps:
covering a metal material layer on a base, and etching a middle portion of the metal material layer corresponding to a transfer pad to form a first metal layer and a first metal recess area in a non-display area and a common line in a display area;
forming a gate insulating layer on the first metal layer, and etching a part of the gate insulating layer corresponding to the transfer pad to form a gate insulating recess area;
forming a second metal layer on the gate insulating layer, and etching a part of the second metal layer corresponding to the gate insulating recess area;
forming a passivation layer on the second metal layer, and etching a part of the passivation layer corresponding to the gate insulating recess area;
forming a transparent electrode layer on the first metal recess area, and communicating the transparent electrode layer with the common line to form a first substrate;
forming a second substrate provided with a common electrode; and
disposing an AU ball on the transparent electrode layer, and communicating the transparent electrode layer of the first substrate with the common electrode of the second substrate by the AU ball.

14. The process for preparing a display panel according to claim 13, wherein in the step of forming a gate insulating layer on the first metal layer, and etching a part of the gate insulating layer corresponding to the transfer pad to form a gate insulating recess area,
a width of the gate insulating recess area is greater than a width of the first metal recess area, an exposed surface of the first metal layer is a first metal transfer pad, and the formed transparent electrode layer covers the first metal transfer pad.

15. The process for preparing a display panel according to claim 13, wherein the first metal layer and the common line of the first substrate are formed in a same layer, and the first metal layer and the common line of the first substrate are electrically connected to each other.

16. A display device, comprising a display panel, the display panel comprising:
a first substrate;
a second substrate opposite to the first substrate, wherein
the first substrate comprises a common line, and the second substrate comprises a common electrode; and
an AU ball disposed in a non-display area of the display panel and configured to conduct the common line of the first substrate and the common electrode of the second substrate, a position where the AU ball is disposed is a transfer pad;
the first substrate comprises:
a base;
a first metal layer disposed on the base and hollowed out corresponding to the transfer pad to form a first metal recess area;
a gate insulating layer disposed on the first metal layer and hollowed out corresponding to the first metal recess area form a gate insulating recess area;
a second metal layer disposed on the gate insulating layer, a part of the second metal layer corresponding to the gate insulating recess area being hollowed out to form a second metal recess area;
a passivation layer disposed on the second metal layer, a part of the passivation layer corresponding to the second metal recess area being hollowed out to form a passivation recess area; and
a transparent electrode layer covering the first metal recess area and communicating with the common line of the first substrate;
the AU ball is disposed on a position of the transparent electrode layer corresponding to the first metal recess area to communicate the transparent electrode layer of the first substrate with the common electrode of the second substrate.

17. The display device according to claim 16, wherein the display device is one of a twisted nematic display device, an in-plane switching display device, and a multi-domain vertical alignment display device.

* * * * *